United States Patent [19]

Campbell et al.

[11] Patent Number: 4,777,221

[45] Date of Patent: Oct. 11, 1988

[54] POLYPHENYLENE ETHER-POLYCARBONATE COPOLYMERS AND METHOD OF PREPARATION

[75] Inventors: John R. Campbell, Clifton Park; Timothy J. Shea, Schenectady, both of N.Y.

[73] Assignee: General Electric Company, Schenectady, N.Y.

[21] Appl. No.: 15,639

[22] Filed: Feb. 17, 1987

[51] Int. Cl.$^4$ .............................................. C08G 81/00
[52] U.S. Cl. .................................. 525/391; 525/394; 525/462; 525/905
[58] Field of Search ................ 525/394, 462, 391, 905

[56] References Cited

U.S. PATENT DOCUMENTS

| | | | |
|---|---|---|---|
| 3,153,008 | 10/1964 | Fox | 528/191 |
| 3,875,256 | 4/1975 | White | 525/462 |
| 4,374,233 | 2/1983 | Loucks et al. | 525/394 |
| 4,377,662 | 3/1983 | Loucks | 525/394 |

*Primary Examiner*—Patricia Short
*Attorney, Agent, or Firm*—William H. Pittman; James C. Davis, Jr.; James Magee, Jr.

[57] ABSTRACT

Polyphenylene ether-polycarbonate copolymers are prepared by reacting a polyphenylene ether, preferably one which has been acid-functionalized by reaction with a compound such as maleic anhydride or fumaric acid, with an aromatic polycarbonate at a temperature of at least about 175° C. in the presence of a polycarbonate-forming transesterification catalyst, typically a tetraalkyl titanate or a tetraalkylammonium tetraphenylborate. Under these conditions, the polycarbonate chain is cleaved and fragments thereof are chemically bonded to the polyphenylene ether.

19 Claims, No Drawings

POLYPHENYLENE ETHER-POLYCARBONATE COPOLYMERS AND METHOD OF PREPARATION

This invention relates to copolymeric compositions and their preparation, and more particularly to polyphenylene ether-polycarbonate copolymers.

The preparation of block copolymers of polyphenylene ethers (also known as polyphenylene oxides) and aromatic polycarbonates is described, for example, in U.S. Pat. Nos. 4,374,233 and 4,377,662. The method therein disclosed is an interfacial polymerization method similar to that used for homopolycarbonates. The products find use in molding, calendering and extrusion methods for conversion into films, sheets, fibers, laminates and the like.

The interfacial method is complicated by the fact that polyphenylene ethers form insoluble complexes with methylene chloride, the solvent typically employed in said method. Such complex formation is disclosed by Factor et al., in *J. Polymer Sci., Polymer Letters Ed.*, 7, 205–209 (1969). This may result in such problems as separation of a further phase and emulsion formation.

Therefore, it is of interest to develop methods for the preparation of similar copolymers which employ different reaction conditions and which have potential for being more widely applicable and more convenient to use than the aforesaid interfacial methods. For example, copolymer preparation in the melt or in solution may be advantageous.

The present invention provides such a method for the preparation of useful polyphenylene ether-polycarbonate copolymers. It also provides a class of novel copolymers prepared by said method.

In one of its aspects, the invention is a method for preparing a copolymer composition which comprises heating a polyphenylene ether containing at least one hydroxy group, or carboxy group or functional derivative thereof, with an aromatic polycarbonate in the presence of an effective amount of a polycarbonate-forming transesterification catalyst.

The polyphenylene ethers used according to the present invention are a well known class of polymers. They are widely used in industry, especially as engineering plastics in applications requiring toughness and heat resistance. Since their discovery, they have given rise to numerous variations and modifications all of which are applicable to the present invention, including but not limited to those described hereinafter.

The polyphenylene ethers comprise a plurality of structural units having the formula

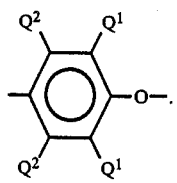

(I)

In each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl. 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties.

The polyphenylene ether generally has a number average molecular weight within the range of about 3,000–40,000, as determined by gel permeation chromatography. Its intrinsic viscosity is most often in the range of about 0.1–0.7 dl./g., as measured in chloroform at 25° C.

The polyphenylene ethers are typically prepared by the oxidative coupling of at least one corresponding monohydroxyaromatic compound. Particularly useful and raadily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and β-diketones. Also useful are known cobalt-containing catalyst systems. Suitable manganese and cobalt-containing catalyst systems for polyphenylene ether preparation are known in the art by reason of disclosure in numerous patents and publications.

Also useful for the purposes of this invention are polyphenylene ethers which comprise molecules having at least one of the end groups of the formulas

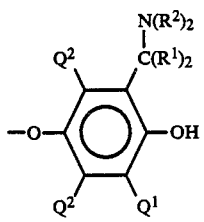
(II)

and

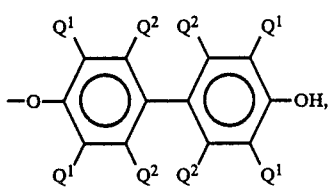
(III)

wherein $Q^1$ and $Q^2$ are as previously defined; each $R^1$ is independently hydrogen or alkyl, with the proviso that the total number of carbon atoms in both $R^1$ radicals is 6 or less; and each $R^2$ is independently hydrogen or a $C_{1-6}$ primary alkyl radical. Preferably, each $R^1$ is hydrogen and each $R^2$ is alkyl, especially methyl or n-butyl.

Polymers containing the aminoalkyl-substituted end groups of formula II may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals. The principal site of reaction is the $Q^1$ radical adjacent to the hydroxy group on the terminal unit of the polymer chain.

During further processing and/or blending the aminoalkyl-substituted end groups may undergo various reactions, probably involving a quinone methide-type intermediate of the formula

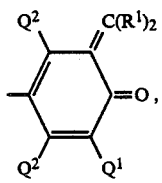
(IV)

often with beneficial effects often including an increase in impact strength and compatibilization with other blend components. Reference is made to U.S. Pat. Nos. 4,054,553, 4,092,294, 4,477,649, 4,477,651 and 4,517,341, the disclosures of which are incorporated by reference herein. However, the free amine simultaneously generated, as well as the aminoalkyl end groups of formula II, may degrade polycarbonates under the conditions of this invention by reacting with carbonate groups therein. Such reactions may be avoided by removing or inactivating amine groups, either as a concomitant result of acid functionalization as described hereinafter or by extrusion with vacuum venting.

Polymers with 4-hydroxybiphenyl end groups of formula III are typically obtained from reaction mixtures in which a by-product diphenoquinone of the formula

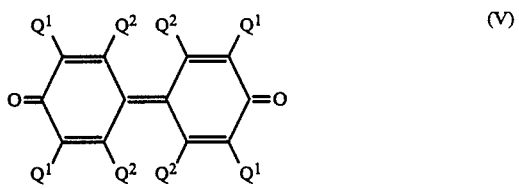
(V)

is present, especially in a copper-halide-secondary or tertiary amine system. In this regard, the disclosure of U.S. Pat. No. 4,477,649 is again pertinent as are those of U.S. Pat. Nos. 4,234,706 and 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas II and III. It should be understood, however, that other end groups may be present and that the invention in its broadest sense may not be dependent on the molecular structures of the polyphenylene ether end groups.

The polyphenylene ether must contain at least one hydroxy group, or carboxy group or functional derivative thereof. Hydroxy groups are, of course, present as end groups on most polyphenylene ethers.

The use of acid-functionalized polyphenylene ethers, either alone or in combination with unfunctionalized polyphenylene ether, is often preferred. Suitable functionalizing compounds contain at least two functional groups selected from the group consisting of (1) carbon-carbon double and triple bonds and (2) carboxylic acid groups or 1,4-phenylene ether) having a number average molecular weight of about 20,000 and an intrinsic viscosity in chloroform at 25° C. of 0.48–0.49 dl./g. functional derivatives thereof, at least one of said carboxylic acid groups or functional derivatives thereof being present. By "functional derivatives" is meant such materials as salts, esters, amides, anhydrides and imides.

At least one of the functional groups in the functionalizing compound is a carboxylic acid group or functional derivative thereof. More than two functional groups, typically three, are frequently present. Among the preferred functionalizing compounds are maleic anhydride, fumaric acid and trimellitic anhydride acid chloride (TAAC).

Functionalization of the polyphenylene ether may be achieved in solution or in the melt, by methods described, for example, in U.S. Pat. No. 4,600,741 and copending, commonly owned application Ser. No. 885,447, filed July 14, 1986, and corresponding PCT application No. 87100540, the disclosures of which are incorporated by reference herein. The method of functionalization is not a critical aspect of the invention.

The proportion of functionalizing compound is most conveniently expressed in terms of weight percent based on total polyphenylene ether. In general, about 0.1–5.0% and preferably about 1–3% of functionalizing agent is employed on this basis.

The preparation of functionalized polyphenylene ethers is illustrated by the following examples. In all the examples herein, parts and percentages are by weight, unless otherwise designated. The polyphenylene ether designated "PPE" in these and other examples was a poly-(2,6-dimethyl-1,4-phenylene ether) having a number average molecular weight of about 20,000 and an intrinsic viscosity in chloroform at 25° C of 0.48–0.49 dl./g.

EXAMPLE 1

A mixture of 100 parts of PPE and 1 part of maleic anhydride was extruded in a Werner-Pfleiderer twin screw extruder at 300 rpm. and 285° C. The product was the desired maleic anhydride-functionalized polyphenylene ether.

EXAMPLES 2–3

The procedure of Example 1 was repeated, substituting 1.4 and 3.0 parts (respectively) of fumaric acid for the maleic anhydride and extruding over a temperature range of about 300°–325° C. Similar products were obtained.

EXAMPLE 4

A solution of 100 parts of PPE, 2 parts of TAAC and 5 parts of dimethyl-n-butylamine in 500 parts of toluene was heated at 95° C. for 3 hours, with stirring. The product was precipitated by addition of methanol, redissolved in toluene and reprecipitated, and dried under reduced pressure. It was shown by infrared spectroscopy to be the desired anhydride-functionalized polyphenylene ether.

The other polymeric reactant according to the invention is an aromatic polycarbonate, typically a homopolycarbonate. The structural units in such polycarbonates generally have the formula

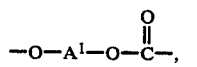 (VI)

wherein $A^1$ is an aromatic radical. Suitable $A^1$ values include m-phenylene, p-phenylene, 4,4'-biphenylene, 2,2-bis (4-phenylene)propane, 2,2-bis(3,5-dimethyl-4-phenylene)propane and similar radicals such as those which correspond to the dihydroxyaromatic compounds disclosed by name or formula (generic or specific) in U.S. Pat. No. 4,217,438. Also included are radicals containing non-hydrocarbon moieties. These may be substituents such as chloro, nitro, alkoxy and the like, and also linking radicals such as thio, sulfoxy, sulfone, ester, amide, ether and carbonyl. Most often, however, all $A^1$ radicals are hydrocarbon radicals.

The $A^1$ radicals preferably have the formula

 (VII)

wherein each of $A^2$ and $A^3$ is a single-ring divalent aromatic radical and Y is a bridging radical in which one or two atoms separate $A^2$ from $A^3$. The free valence bonds in formula VII are usually in the meta or para positions of $A^2$ and $A^3$ in relation to Y. Such $A^1$ values may be considered as being derived from bisphenols of the formula $HO-A^2-Y-A^3OH$. Frequent reference to bisphenols will be made hereinafter, but it should be understood that $A^1$ values derived from suitable compounds other than bisphenols may be employed as appropriate.

In formula VII, the $A^2$ and $A^3$ values may te unsubstituted phenylene or substituted derivatives thereof, illustrative substituents (one or more) being alkyl, alkenyl (e.g., crosslinkable-graftable moieties such as vinyl and allyl), halo (especially chloro and/or bromo), nitro, alkoxy and the like. Unsubstituted phenylene radicals are preferred. Both $A^2$ and $A^3$ are preferably p-phenylene, although both may be o-or m-phenylene or one o- or m-phenylene and the other p-phenylene.

The bridging radical, Y, is one in which one or two atoms, preferably one, separate $A^2$ from $A^3$. It is most often a hydrocarbon radical and particularly a saturated radical such as methylene, cyclohexylmethylene, 2-[2.2.1]-bicycloheptylmethylene, ethylene, 2,2-propylene, 1,1-(2,2-dimethylpropylene), 1,1-cyclohexylene, 1,1-cyclopentadecylene, 1,1-cyclododecylene or 2,2-adamantylene, especially a gem-alkylene radical. Also included, however, are unsaturated radicals and radicals which are entirely or partially composed of atoms other than carbon and hydrogen. Examples of such radicals are 2,2-dichloroethylidene, carbonyl, thio and sulfone. For reasons of availability and particular suitability for the purposes of this invention, the preferred $A^1$ radical is the 2,2-bis(4-phenylene)propane radical, which is derived from bisphenol A and in which Y is isopropylidene and $A^2$ and $A^3$ are each p-phenylene.

The weight average molecular weight of the polycarbonate, as determined by gel permeation chromatography relative to polystyrene, is generally at least about 25,000 and preferably at least about 50,000. There is no real upper limit for molecular weight, but values above about 200,000 are not readily available from most sources.

The catalysts useful in the method of this invention include all those suitable for use in the preparation of polycarbonates by transesterification; for example, from bisphenols and diaryl carbonates or from bisphenol diesters and dialkyl carbonates. Numerous catalysts of this type are disclosed in the prior art. Reference is made, for example, to the following U.S. patents, the disclosures of which are incorporated by reference herein:

| | |
|---|---|
| 3,153,008 | 4,345,062 |
| 3,442,854 | 4,452,968. |
| 4,323,668 | |

Illustrative catalysts are inorganic and organic bases such as sodium hydroxide, sodium hydride, sodium methoxide, sodium borohydride, lithium aluminum hydride, the disodium salt of bisphenol A and 1,2,2,6,6-pentamethylpyridine; tetraarylborates such as sodium tetraphenylborate, tetramethylammonium tetraphenylborate and tetra-n-butylammonium tetraphenylborate; and titanates and zirconates such as titanium bis(acetylacetonate), tetraisopropyl titanate and tetraoctyl titanate and the corresponding zirconates. The tetraarylborates and titanates, particularly tetraalkyl titanates and tetraalkylammonium tetraphenylborates, are preferred.

The method of this invention is effected by heating the polyphenylene ether, polycarbonate and catalyst.

The reaction temperature is generally at least about 100° C., preferably at least about 175° C., and most often about 200°–250° C. It may take place in the melt or in solution in a suitable solvent; illustrative solvents are o-dichlorobenzene and 1,2,4-trichlorobenzene.

The proportions of reagents used are not critical and will depend largely on the proportion of polyphenylene ether and polycarbonate moieties desired in the copolymer. For the most part, a weight ratio of polyphenylene ether to polycarbonate in the range of about 0.5–2.0:1 is suitable. The proportion of catalyst is generally about 250–3000 ppm. based on polycarbonate.

It is believed that copolymer formation occurs according to the present invention by nucleophilic attack of the polyphenylene ether on the carbonate groups of the polycarbonate, resulting in cleavage thereof and formation of a bond between fragments thereof and the polyphenylene ether. Thus, the copolymer generally contains polycarbonate moieties of lower molecular weight than the polycarbonate reactant. The mixture generally also contains residual homopolymeric polycarbonate and polyphenylene ether.

If the reaction has been conducted in solution, the polymeric product may be isolated by conventional operations, typically precipitation with a non-solvent such as methanol. Some separation of homopolymer reactants from copolymer may then be achieved by treatment with methylene chloride. Homopolycarbonate, being soluble in methylene chloride, will remain in solution while homopolymeric polyphenylene ether will be precipitated as the methylene chloride complex, accompanied by a major proportion of the copolymer product.

Since any polycarbonate present in the methylene chloride complex may be assumed to be copolymer, the proportion of copolymer may be determined from the results of proton nuclear magnetic resonance analysis. In certain instances, the methylene chloride solution is also found to cohtain polyphenylene ether, probably as copolymer in which the polycarbonate portion predominates. When this is the case, the polymeric contents of the solution may be similarly analyzed.

The reaction of both unfunctionalized and acidfunctionalized polyphenylene ethers with polycarbonates under the above-described conditions has been confirmed by model reactions, substituting diphenyl carbonate for the polycarbonate. In the case of unfunctionalized polyphenylene ethers, a carbonate band not present in the reactant is found in the product by Fourier transform infrared spectroscopy (FTIR). In addition, the product formed from an acid-functionalized polyphenylene ether contains a phenyl ester band not present in the reactant. The copolymers obtained from acid-functionalized polyphenylene ethers themselves constitute another aspect of the invention.

In the following examples, "PPE-VV" designates PPE which has been extruded at about 300° C. with full vacuum venting. The polycarbonate employed was a bisphenol A homopolycarbonate having a weight average molecular weight of about 71,000, as determined by gel permeation chromatography relative to polystyrene.

EXAMPLES 1–4

Solutions of 5 grams each of polycarbonate and various polyphenylene ethers in 100 ml. of dry 1,2,4-trichlorobenzene were heated under reflux in a nitrogen atmosphere, with stirring, in the presence of 30 mg. of various polycarbonate-forming transesterification catalysts. Refluxing was continued for 18 hours, after which the solutions were cooled and the crude products were isolated by precipitation into methanol, removed by filtration and dried in a vacuum oven.

The crude products were dissolved in warm methylene chloride at a concentration of 5 grams per 100 ml. and the solutions were chilled, whereupon the methylene chloride complexes of the polyphenylene ethers precipitated. They were removed by filtration and analyzed by proton nuclear magnetic resonance spectroscopy. In Example 2, the polymer which remained in solution in methylene chloride was isolated as previously described and was also analyzed.

The results are given in the following table, in comparison with a control treated by the same procedure except that the catalyst was omitted.

| Example | Polyphenylene ether | Catalyst | % polycarbonate in complex | Copolymer Mw | Copolymer Mn |
|---|---|---|---|---|---|
| 1 | PPE | Tetraisopropyl titanate | 20 | 103,000 | 19,000 |
| 2 | Example 3 | Tetraisopropyl titanate | 30* | 317,000 | 31,000 |
| 3 | PPE-VV | Tetraisopropyl titanate | 24 | 172,000 | 24,000 |
| 4 | PPE-VV | Tetra-n-butyl-ammonium tetraphenylborate | 22 | — | — |
| Control | PPE | — | 0 | — | — |

*18% of polymer remaining in solution in methylene chloride was copolymerized polyphenylene ether.

We claim:

1. A method for preparing a copolymer composition which comprises heating a polyphenylene ether containing at least one hydroxy group, or carboxy group or functional derivative thereof, with an aromatic polycarbonate having a weight average molecular weight of at least about 25,000 in the presence of an effective amount of a polycarbonate-forming transesterification catalyst.

2. A method according to claim 1 wherein the polyphenylene ether comprises a plurality of structural units having the formula

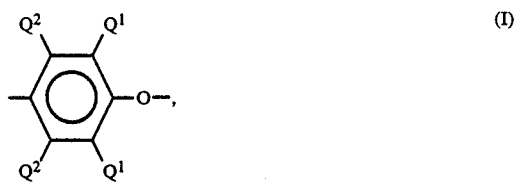

and in each of said units independently, each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$; the polycarbonate comprises structural units of the formula

wherein $A^1$ is an aromatic radical; and the reaction temperature is at least about 175° C.

3. A method according to claim 2 wherein $A^1$ has the formula $$-A^2-Y-A^3- \qquad (VII)$$

wherein each of $A^2$ and $A^3$ is a single-ring divalent aromatic radical and Y is a bridging radical in which one or two atoms separate $A^2$ from $A^3$.

4. A method according to claim 3 wherein the catalyst is a tetraarylborate or a titanate and the reaction temperature is in the range of about 200°–250° C.

5. A method according to claim 4 wherein the polyphenylene ether is a poly(2,6-dimethyl-1,4-phenylene ether).

6. A method according to claim 5 wherein the polycarbonate is a bisphenol A polycarbonate.

7. A method according to claim 6 wherein the catalyst is a tetraalkyl titanate or a tetraalkylammonium tetraphenylborate and the polycarbonate has a weight average molecular weight of at least about 50,000.

8. A method according to claim 3 wherein the polyphenylene ether has been functionalized by reaction with a compound containing at least two functional groups selected from the group consisting of (1) carbon-carbon double and triple bonds and (2) carboxylic acid groups or functional derivatives thereof, at least one of said carboxylic acid groups or functional derivatives thereof being present.

9. A method according to claim 8 wherein the functionalizing compound is maleic anhydride, fumaric acid or trimellitic anhydride acid chloride.

10. A method according to claim 9 wherein the catalyst is a tetraarylborate or a titanate and the reaction temperature is in the range of about 200°–250° C.

11. A method according to claim 10 wherein the polyphenylene ether is a poly(2,6-dimethyl-1,4-phenylene ether).

12. A method according to claim 11 wherein the polycarbonate is a bisphenol A polycarbonate.

13. A method according to claim 12 wherein the catalyst is a tetraalkyl titanate or a tetraalkylammonium tetraphenylborate and the polycarbonate has a weight average molecular weight of at least about 50,000.

14. A method according to claim 13 wherein the functionalizing compound is fumaric acid.

15. A copolymer composition prepared by the method of claim 8.

16. A copolymer composition prepared by the method of claim 9.

17. A copolymer composition prepared by the method of claim 11.

18. A copolymer composition prepared by the method of claim 12.

19. A copolymer composition prepared by the method of claim 14.

* * * * *